Aug. 18, 1970    IKUO MORI    3,524,699

SYMMETRICAL RELAY LENS OF EQUI-MAGNIFICATION

Filed April 24, 1968

——— d-line
----- g-line
—·— F-line
—··— C-line

United States Patent Office 3,524,699
Patented Aug. 18, 1970

3,524,699
SYMMETRICAL RELAY LENS OF EQUI-MAGNIFICATION
Ikuo Mori, Kawasaki-shi, Japan, assignor to Nippon Kogaku K.K., Tokyo, Japan, a corporation of Japan
Filed Apr. 24, 1968, Ser. No. 723,801
Claims priority, application Japan, May 13, 1967, 42/30,031
Int. Cl. G02b 9/00, 9/08, 9/62
U.S. Cl. 350—210                  4 Claims

ABSTRACT OF THE DISCLOSURE

A relay lens system wherein negative lens elements are symmetrically provided on both sides of the stop, each negative element being a cemented triplet comprising a double convex negative and two positive lens elements. The central positive lens elements has a larger dispersive power than the negative lens element whereby the aberration of color is satisfactorily corrected.

---

This invention relates to the relay lens system of various kinds of optical instruments and in particular this invention relates to the so called lens of equi-magnification for forming an image of the object at a finite distance at the magnifying power of 1.

In the conventional lenses of this kind, aperture ratio is too small and in the case of the lenses having the same aperture ratio as this embodiment, the correction of the axial chromatic aberration and the correction of the near-axial chromatic aberration, and the correction of spherical aberration which influence the image forming performances, are not satisfactory.

The lens of this invention aims at the correction of these aberrations, and as a result it is possible to produce the lens system having the effective aperture ratio of F/2, high resolving power, remarkably little spherical and chromatic aberration (the wave length range thereof being from 436 m$\mu$ g ray to 656 m$\mu$ c ray.

In accordance with this invention, the spherical aberration, astigmatism, axial chromatic aberration, and near-axial chromatic aberration can be excellently corrected, and it is possible to obtain the relay lens of equi-magnification of high resolving power having such a lightness as the effective aperature ratio of F/2.

In accordance with this invention, relay lens system of equi-magnification provides a positive lens $L_1$ cemented or separated, a positive meniscus lens $L_2$, and a negative meniscus lens $L_3$ prepared by cementing three lenses, by respectively directing the convex surface thereof towards the incident direction of the light rays, and are provided the group of lens $L_1$ through $L_3$ symmetrically to the diaphragm, wherein the condition given as follows are satisfied, (I)     $|R_8| < |R_7|$
(II)    $n_5 > n_6$
(III)   $v_5 < v_6$
(IV)    $d_9 > |R_9|$ (wherein R is the radius of curvature of the respective lenses; n is the refractive index; v is Abbe's number; and d is air space).

Figure 1:
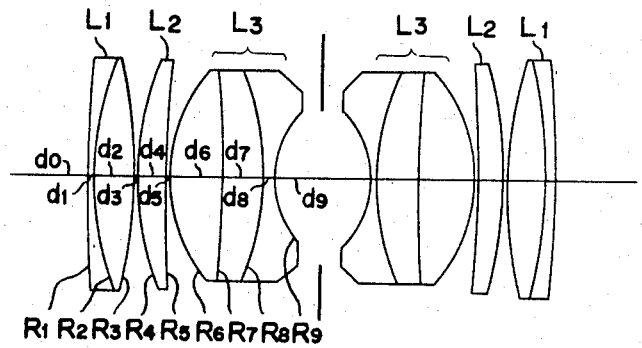
Figure 3:
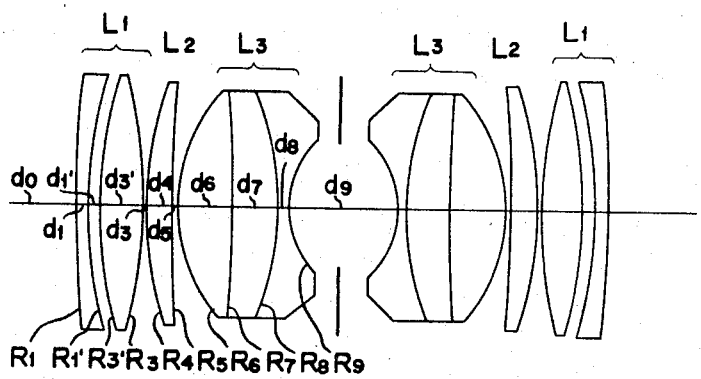
Figure 2:
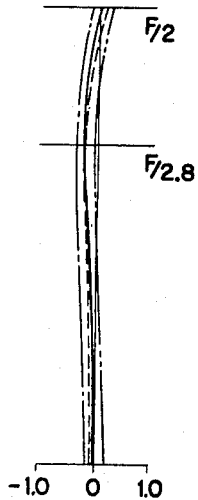
Figure 2:
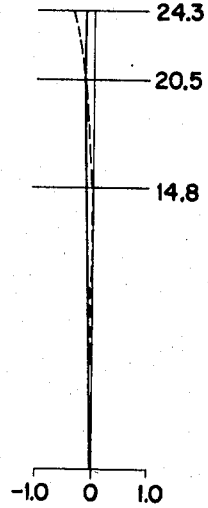
Figure 4:
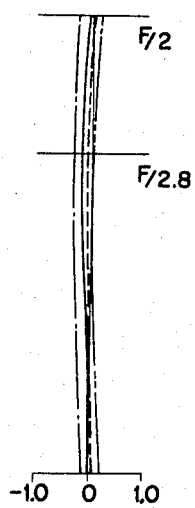
Figure 4:
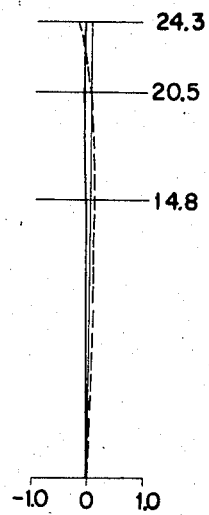

This invention will be described more clearly referring to the illustrative embodiments shown in the attached drawing, in which:

FIG. 1 is the cross sectional view of the lens system of embodiment 1,
FIG. 2 is the diagram showing the curves of aberrations of embodiment 1,
FIG. 3 is the cross sectional view of the lens system of embodiment 2,
FIG. 4 is the diagram showing the curves of aberration of embodiment 2.

Referring first to FIG. 1; $L_1$ is a cemented positive lens; $L_2$ is a positive meniscus lens; $L_3$ is a negative meniscus lens prepared by cementing three lenses; and $L_1$ to $L_3$ are provided with predetermined intervals with the convex surface directed towards the incident direction of the light rays. A diaphragm is provided at the back of meniscus lens $L_3$ and the said lenses $L_1$ to $L_3$ are symmetrically provided with the diaphragm in between them form the relay lens system, and they are composed so as to saisfy the following conditions.

(I)     $|R_8| < |R_7|$
(II)    $n_5 > n_6$
(III)   $v_5 < v_6$
(IV)    $d_9 > |R_9|$

It is known that lens composed in the symmetrical form as mentioned above, the coma, distortion, off-axial chromatic aberration can be excellently corrected.

However, spherical aberration, axial chromatic aberration, astigmatism and the like cannot be corrected easily by the conventional means for correcting aberration.

In other words, in a lens of large aperture ratio for the above mentioned object, a glass of high refractive index is used for the whole lens system to carry out the correction of spherical aberration or astigmatism, but the recently developed glass of high refractive index has great partial dispersion when compared with the glass of low refractive index, and certain restriction is given to the correction of near-axial chromatic aberration in the range of the wave length previously mentioned, particularly at 656 m$\mu$ (c line) and the neighborhood, and therefore in order to reproduce the detail of the object to be photographed faithfully, it is necessary to correct the near-axial aberration to be in the minimum.

The lens system of this invention removes the above problem by using the glass of low refractive index of comparatively less partial dispersion compared with that of the glass of comparatively high refractive index, and the refractive index n of the glass to be used for all the lenses should be below 1.66.

When the lenses should be composed of such glass alone, the spherical aberration and axial chromatic aberration are increased naturally, and for the correction of the aberration, in the lens system of this invention, the third lens $L_3$ is composed of three lenses being cemented, and the condition I is given to the curvature of the respective cemented surface, and the conditions II and III are given to the central lens and the lens on the side of diaphragm of $L_3$.

Namely, when the cemented surface $|R_8|$ is made smaller than $|R_7|$ and when it is provided so as to make it convex towards the diaphragm, and when the refractive index of the central lens is greater than that of the lens on the side of the diaphragm, the cemented surface $R_8$ comes to have the condensing effect. Since the radius of curvature is relatively smaller, the light flux comes to receive stronger refraction effect as it goes to the peripheral portion.

Therefore, the generation of the aberration of the light rays passing through the remotest portion (the peripheral portion) from the light axis becomes greater than that of the light rays passing through the portion near the light axis (the central portion of the lens).

In other words, the difference of the change of the spherical aberration in the negative direction becomes remarkably greater.

In accordance with this invention, the spherical aberration in the periphery of a lens greatly curved in the positive direction, can be removed by the above mentioned reasons.

The condition III removes the axial chromatic aberration of $g$ line in the peripheral portion apt to be brought about in a lens of large aperture ratio. Namely, axial chromatic aberration is generated greater in the positive direction, but as in the condition III, the central lens of larger dispersion rate than that of the lens on the side of the diaphragm is provided, so that the peripheral light rays of $g$ line can receive stronger refraction effect than that of standard wave length $d$ line by the cemented surface to the effect that the axial chromatic aberration in the positive direction can be removed.

Therefore it is needless to mention here that the resolving power is further improved. The above described structure means that the light rays in the central portion of the aslant light flux passes through the neighborhood of the light axis, and no bad effect is given to the astigamatism, and it is convenient for carrying out the correction of the spherical aberration or axial chromatic aberration, but even if the lenses should be composed within the above mentioned range, when the radius of curvature $R_8$ is unnecessarily made smaller of the difference of refractive index of the central lens of $L_3$ and that of the lens on the side of the diaphragm is made larger, a large amount of spherical aberration is generated in the negative direction, and therefore it is preferable to have it within the range of $|R_8|>|R_9|$, $n_5-n_6<0.1$.

When the difference of the dispersion of the central lens of $L_3$ and that of the lens on the side of the diaphragm should be made too large, and the spherical aberration on $g$ line can be more excellently corrected, but the spherical aberration on C line is greatly generated in the positive direction on the contrary, and the lack of the correction of the spherical aberrations on up and down lines, and therefore it is preferable to be determined within the range of $v_5-v_6<1.5$.

As is apparent from the above given reasons, when it goes beyond the range of the conditions I and II, a large amount of the spherical aberration is generated in the positive direction, and when it goes beyond the range of the condition III the deterioration of the axial chromatic aberration on $g$ line is incurred, and it is not practical.

As deterioration of astigmatism, caused when the refractive index are lowered as a whole, can be prevented by having condition III, being given relatively smaller curvature to $R_9$ and being made the air space $d_9$ therebetween larger than $R_9$, in particular, it can correct astigmatism along to vary the value of $d_9$. It is effective to divide the lens $L_1$ as is embodiment II (FIG. 3) in further correcting the spherical aberration (FIG. 4).

The following are the embodiments of this invention.

R in the following embodiments is the radius of curvature of the respective lenses, and $d$ is the thickness of the lens or the air space between the lenses, and $n$ is the refractive index of the respective lenses, and $v$ is Abbe's number.

EMBODIMENT I.—(FIG. 1)
F/2  f=100

| | $d_0=75.638$ | | |
|---|---|---|---|
| $R_1=285.84$ | $d_1=1.6$ | $n_1=1.62004$ | $v_1=36.3$ |
| $R_2=71.95$ | $d_2=8.0$ | $n_2=1.62041$ | $v_2=60.3$ |
| $R_3=-116.26$ | $d_3=0.12$ | | |
| $R_4=62.24$ | $d_4=6.05$ | $n_3=1.62041$ | $v_3=60.3$ |
| $R_5=544.73$ | $d_5=0.12$ | | |
| $R_6=31.58$ | $d_6=10.85$ | $n_4=1.62041$ | $v_4=60.3$ |
| $R_7=-1027.80$ | $d_7=8.91$ | $n_5=1.64831$ | $v_5=33.8$ |
| $R_8=-59.04$ | $d_8=1.71$ | $n_6=1.62004$ | $v_6=36.3$ |
| $R_9=17.93$ | $d_9=19.53$ | | |
| $R_9=-17.93$ | | | |
| $R_8=59.04$ | $d_8=1.71$ | $n_6=1.62004$ | $v_6=36.3$ |
| $R_7=1027.80$ | $d_7=8.91$ | $n_5=1.64831$ | $v_5=33.8$ |
| $R_6=-31.58$ | $d_6=10.85$ | $n_4=1.62041$ | $v_4=60.3$ |
| $R_5=-544.73$ | $d_5=0.12$ | | |
| $R_4=-62.24$ | $d_4=6.05$ | $n_3=1.62041$ | $v_3=60.3$ |
| $R_3=116.26$ | $d_3=0.12$ | | |
| $R_2=-71.95$ | $d_2=8.0$ | $n_2=1.62041$ | $v_2=60.3$ |
| $R_1=-285.84$ | $d_1=1.6$ | $n_1=1.62004$ | $v_1=36.3$ |
| | B. $f=75.638$ | | |

EMBODIMENT II.—(FIG. 3)
F/2  f=100
(In the following table $R_2$ and $d_2$ are deleted, and $R_1'$, $R_3'$, $d_1'$ and $d_3'$ are added)

| | $d_0=75.246$ | | |
|---|---|---|---|
| $R_1=304.2$ | $d_1=1.83$ | $n_1=1.62004$ | $v_1=36.3$ |
| $R_1'=77.66$ | $d_1'=2.51$ | | |
| $R_3'=83.64$ | $d_3'=8.34$ | $n_2=1.62041$ | $v_2=60.3$ |
| $R_3=-111.12$ | $d_3=0.12$ | | |
| $R_4=65.44$ | $d_4=6.28$ | $n_3=1.62041$ | $v_3=60.3$ |
| $R_5=569.9$ | $d_5=0.12$ | | |
| $R_6=33.0$ | $d_6=11.36$ | $n_4=1.62041$ | $v_4=60.3$ |
| $R_7=-571.0$ | $d_7=9.14$ | $n_5=1.64831$ | $v_5=33.8$ |
| $R_8=-55.96$ | $d_8=1.83$ | $n_6=1.62588$ | $v_6=35.6$ |
| $R_9=18.88$ | $d_9=22.38$ | | |
| $R_9=-18.88$ | | | |
| $R_8=55.96$ | $d_8=1.83$ | $n_6=1.62588$ | $v_6=35.6$ |
| $R_7=571.0$ | $d_7=9.14$ | $n_5=1.64831$ | $v_5=33.8$ |
| $R_6=-33.0$ | $d_6=11.36$ | $n_4=1.62041$ | $v_4=60.3$ |
| $R_5=-569.9$ | $d_5=0.12$ | | |
| $R_4=-65.44$ | $d_4=6.28$ | $n_3=1.62041$ | $v_3=60.3$ |
| $R_3=111.12$ | $d_3=0.12$ | | |
| $R_3'=-83.64$ | $d_3'=8.34$ | $n_2=1.62041$ | $v_2=60.3$ |
| $R_1'=-77.66$ | $d_1'=2.51$ | | |
| $R_1=-304.2$ | $d_1=1.83$ | $n_1=1.62004$ | $v_1=36.3$ |
| | B. $f=75.246$ | | |

What is claimed is:

1. Relay lens system of equi-magnification for forming an image of an object at a finite distance, comprising a stop, two convergent groups arranged symmetrical with respect to the stop, each group including a positive doublet, a single positive lens element provided nearer to the stop than the positive doublet, and a cemented negative meniscus triplet sandwiched between the single positive lens element and the stop, said triplet consisting of a first positive lens element, a double concave negative lens element and a positive lens element sandwiched between the first positive lens element and the negative lens element thereby providing a cemented surface between said positive lens element and said double concave negative lens element which is convex toward said stop, said first positive lens element having a higher dispersive power than that of said negative lens element for correcting the spherical aberration of color.

2. Relay lens system according to claim 2, in which said positive doublet consisting of negative lens element and a double convex positive lens element air spaced from the negative lens element for correcting the spherical aberration.

3. Relay lens system according to claim 2 having the following numerical data:

F/2  f=100

| | $d_0=75.638$ | | |
|---|---|---|---|
| $R_1=285.84$ | $d_1=1.6$ | $n_1=1.62004$ | $v_1=36.3$ |
| $R_2=71.95$ | $d_2=8.0$ | $n_2=1.62041$ | $v_2=60.3$ |
| $R_3=-116.26$ | $d_3=0.12$ | | |
| $R_4=62.24$ | $d_4=6.05$ | $n_3=1.62041$ | $v_3=60.3$ |
| $R_5=544.72$ | $d_5=0.12$ | | |
| $R_6=31.58$ | $d_6=10.85$ | $n_4=1.62041$ | $v_4=60.3$ |
| $R_7=-1027.80$ | $d_7=8.91$ | $n_5=1.64831$ | $v_5=33.8$ |
| $R_8=-59.04$ | $d_8=1.71$ | $n_6=1.62004$ | $v_6=36.3$ |
| $R_9=17.93$ | $d_9=19.53$ | | |
| $R_9=-17.93$ | $d_8=1.71$ | $n_6=1.62004$ | $v_6=36.3$ |
| $R_8=59.04$ | $d_7=8.91$ | $n_5=1.64831$ | $v_5=33.8$ |
| $R_7=1027.80$ | $d_6=10.85$ | $n_4=1.62041$ | $v_4=60.3$ |
| $R_6=-31.58$ | $d_5=0.12$ | | |
| $R_5=-544.73$ | $d_4=6.05$ | $n_3=1.62041$ | $v_3=60.3$ |
| $R_4=-62.24$ | $d_3=0.12$ | | |
| $R_3=116.26$ | $d_2=8.0$ | $n_2=1.62041$ | $v_2=60.3$ |
| $R_2=-71.95$ | $d_1=1.6$ | $n_1=1.62004$ | $v_1=36.3$ |
| $R_1=-285.84$ | | | |
| | B. $f=75.638$ | | | wherein $R_1$, $R_2$ ... is the radius of curvature of the respective lenses, $d_0$ the distance to the object and $d_1$, $d_2$ ... the thickness of the respective lenses and air spaces between the lens, $n_1$, $n_2$ ... is the refractive index of the respective lenses and $v_1$, $v_2$ ... is the Abbe number.

4. Relay lens system according to claim 3 having the following numerical data:

F/2  f=100

| | $d_0=75.246$ | | |
|---|---|---|---|
| $R_1=304.2$ | $d_1=1.83$ | $n_1=1.62004$ | $v_1=36.3$ |
| $R_{1}'=77.66$ | $d_1'=2.51$ | | |
| $R_{3}'=83.64$ | $d_2'=8.34$ | $n_2=1.62941$ | $v_2=60.3$ |
| $R_3=-111.12$ | $d_3=0.12$ | | |
| $R_4=65.44$ | $d_4=6.28$ | $n_3=1.62041$ | $v_3=60.3$ |
| $R_5=569.9$ | $d_5=0.12$ | | |
| $R_6=33.0$ | $d_6=11.36$ | $n_4=1.62041$ | $v_4=60.3$ |
| $R_7=-571.0$ | $d_7=9.14$ | $n_5=1.64831$ | $v_5=33.8$ |
| $R_8=-55.96$ | $d_8=1.83$ | $n_6=1.62588$ | $v_6=35.6$ |
| $R_9=18.88$ | $d_9=22.38$ | | |
| $R_9=-18.88$ | $d_8=1.83$ | $n_6=1.62588$ | $v_6=35.6$ |
| $R_8=55.96$ | $d_7=9.14$ | $n_5=1.64831$ | $v_5=33.8$ |
| $R_7=571.0$ | $d_6=11.36$ | $n_4=1.62041$ | $v_4=60.3$ |
| $R_6=-33.0$ | $d_5=0.12$ | | |
| $R_5=-569.9$ | $d_4=6.28$ | $n_3=1.62041$ | $v_3=60.3$ |
| $R_4=-65.44$ | $d_3=0.12$ | | |
| $R_3=111.12$ | $d_2'=8.34$ | $n_2=1.62041$ | $v_2=60.3$ |
| $R_3'=-83.64$ | $d_1'=2.51$ | | |
| $R_2'=-77.66$ | $d_1=1.83$ | $n_1=1.62004$ | $v_1=36.3$ |
| $R_1=-304.2$ | | | |
| | B. $f=75.246$ | | | wherein $R_1$, $R_{1'}$, $R_{3'}$ ... is the radius of curvature of the respective lenses, $d_0$ is distance to the object and $d_1$, $d_{1'}$, $d_{3'}$ ... is the thickness of the lenses and air space between the lenses, $n_1$, $n_2$ ... is the refractive index of the respective lenses and $v_1$, $v_2$ ... is the Abbe number.

References Cited

UNITED STATES PATENTS 2,481,639  9/1949  Altman et al. _____ 350—210
3,306,695  2/1967  Baker _____ 350—234 X

FOREIGN PATENTS 466,575  11/1951  Italy.

DAVID SCHONBERG, Primary Examiner
P. A. SACHER, Assistant Examiner

U.S. Cl. X.R.
350—214, 215, 228, 234